United States Patent [19]

Kirstein

[11] Patent Number: 5,156,448
[45] Date of Patent: Oct. 20, 1992

[54] HYDRAULIC BRAKE SYSTEM

[75] Inventor: Lothar Kirstein, Ditzingen, Fed. Rep. of Germany

[73] Assignee: Robert Bosch GmbH, Stuttgart, Fed. Rep. of Germany

[21] Appl. No.: 702,532

[22] Filed: May 20, 1991

[30] Foreign Application Priority Data

Jul. 5, 1990 [DE] Fed. Rep. of Germany ....... 4021454

[51] Int. Cl.$^5$ ............... B60T 8/32; B60T 8/44; B60T 8/48; B60K 28/16
[52] U.S. Cl. ............... 303/113 TR; 303/116 SP; 303/119 R; 303/DIG. 5; 303/DIG. 6
[58] Field of Search ............ 303/113 TR, 113 TB, 303/113 R, DIG. 5, DIG. 6, 100, 110, 93, 116 R, 116 SP, 116 WP, 119 R, 68-69, 10; 180/197; 188/181 A

[56] References Cited

U.S. PATENT DOCUMENTS

| 4,818,039 | 4/1989 | Bertling et al. ............... 303/113 R |
| 4,861,116 | 8/1989 | Bernhardt et al. ........... 303/113 TR |
| 4,900,102 | 2/1990 | Jonner et al. |
| 4,921,313 | 5/1990 | Arikawa .................. 303/116 R |
| 4,940,293 | 7/1990 | Burckhardt et al. ......... 303/113 TR |
| 5,026,127 | 6/1991 | Arikawa .................. 303/116 R |

Primary Examiner—Douglas C. Butler
Attorney, Agent, or Firm—Edwin E. Greigg; Ronald E. Greigg

[57] ABSTRACT

A hydraulic brake system with an anti-skid system (ABS) and traction control (ASR) for motor vehicles having a hydraulic unit with at least one control valve and a return pump with at least one pump element embodied as self-aspirating, which element is operative in the brake circuit containing the at least one driven wheel. To furnish brake pressure during traction control, a valve assembly is provided. For the sake of simplicity in the embodiment of this valve unit, it has not only a charge valve disposed in an intake line between the pump element and the brake fluid tank but also a reversing valve, incorporated between the master brake cylinder and the control valve and having three hydraulic control inlets and a restoring spring, of which one control inlet communicate with the outlet of the pump element, and the two control inlets counteracting this control element communicate with the valve inlet and outlet, respectively. A check valve having a parallel throttle provides for an adequate pressure difference for reversal of the reversing valve upon a buildup of pressure at the outlet of the pump element.

26 Claims, 3 Drawing Sheets

HYDRAULIC BRAKE SYSTEM

BACKGROUND OF THE INVENTION

The invention is based on a hydraulic brake system with an anti-skid system (ABS) and traction control (ASR) for motor vehicles.

In a known brake system of this type, which is embodied as a dual-circuit brake system with front/rear axle or front/rear brake circuit distribution (German Offenlegungsschrift 38 16 073, now U.S. Pat. No. 4,900,102), the reversing valve is embodied as a 3/2-way magnet valve with spring restoration in the connecting line between the master brake cylinder and the hydraulic unit; in its unexcited basic position, it keeps the connecting line open and thus connects not only the control valves assigned to the wheel brake cylinders of the driven wheels, but also the outlet of the operative pump element in the brake circuit of the driven wheels, to the master brake cylinder, while in its reversed position brought about in traction control, it disconnects the connecting line and connects the outlet of the pump element to the brake fluid tank, via a series circuit of two pressure limiting valves. The reversing valve is controlled by the electronic control system and is switched over whenever at least one of the driven wheels is exhibiting slip. At the same time, the return pump is switched on. The operative pump element in the brake circuit of the driven wheels, which is embodied as self-aspirating, aspirates brake fluid from the brake fluid tank via the charge valve and produces a brake supply pressure that is fed via the control valves into the wheel brake cylinders of the driven wheel or wheels that are slipping. Excess brake fluid is returned to the brake fluid tank via the reversing valve and the pressure limiting valves.

OBJECT AND SUMMARY OF THE INVENTION

The brake system according to the invention has an advantage that the valve assembly for furnishing brake pressure in traction control is embodied purely hydraulically and has no components that necessitate electric triggering. This makes it easier to integrate various structural parts of the valve assembly.

In traction control, only the return pump is switched on. The at least one self-aspirating pump element assigned to a driven wheel aspirates brake fluid from the brake fluid tank in a known manner via the opened charge valve, and on its output side it generates a brake supply pressure. As a result of the pressure difference established in this process at the check valve, the hydraulic 2/2-way valve is switched over to its blocking position. The master brake cylinder is thus disconnected from the brake circuit that includes at least one driven wheel. The throttle connected parallel to the check valve is dimensioned such that the pressure difference is maintained at an adequate level even during the intake phase of the pump element. The damper chamber at the outlet of the pump element is also helpful, acting as a reservoir. At the end of traction control, the 2/2-way valve is reset by its restoring spring, and the communication between the master brake cylinder and the hydraulic unit is thus re-established. Upon brake pedal actuation—even during traction control—the 2/2-way valve is reset in every case via its third control inlet, which assures that braking can be initiated via the brake pedal even during traction control. If the brake system is embodied as a dual-circuit system, then the two brake circuits remain disconnected from one another even during traction control.

By means of the provisions recited herein, advantageous further features of and improvements to the brake system disclosed are possible In a preferred embodiment of the invention, the return line, connected to the pressure limiting valve, communicates with the brake fluid tank. The pressure limiting valve has a further control inlet, which acts counter to the control inlet communicating with the valve inlet and communicates with the brake circuit outlet of the master brake cylinder, so that the pressure at the brake circuit outlet of the master brake cylinder is present as a control pressure at the pressure limiting valve that counteracts the inlet pressure of the pressure limiting valve. Thus, upon brake pedal actuation, the pressure limiting valve is blocked and prevents brake fluid from flowing into the brake fluid tank via the pressure limiting valve.

In an alternative embodiment of the invention, the return line connected to the pressure limiting valve communicates with the brake circuit outlet of the master brake cylinder. In that case, the second control inlet of the pressure limiting valve is omitted.

In another advantageous embodiment of the invention, the hydraulic 2/2-way valve, the check valve, and the throttle connected parallel to the check valve are combined into one structural unit.

The brake system according to the invention may be embodied as a dual-circuit brake system for motorcycles or motor vehicles, in the latter case with either diagonal or front/rear axle brake circuit distribution. In the case of diagonal brake circuit distribution, so-called plungers can also be provided, as known from German Offenlegungsschrift 36 33 687 (U.S. Pat. No. 4,818,039), and may be located in the brake circuit of the driven wheels.

The invention will be better understood and further objects and advantages thereof will become more apparent from the ensuing detailed description of preferred embodiments take in conjunction with the drawings.

THE PREFERRED EMBODIMENTS

Figure 1:
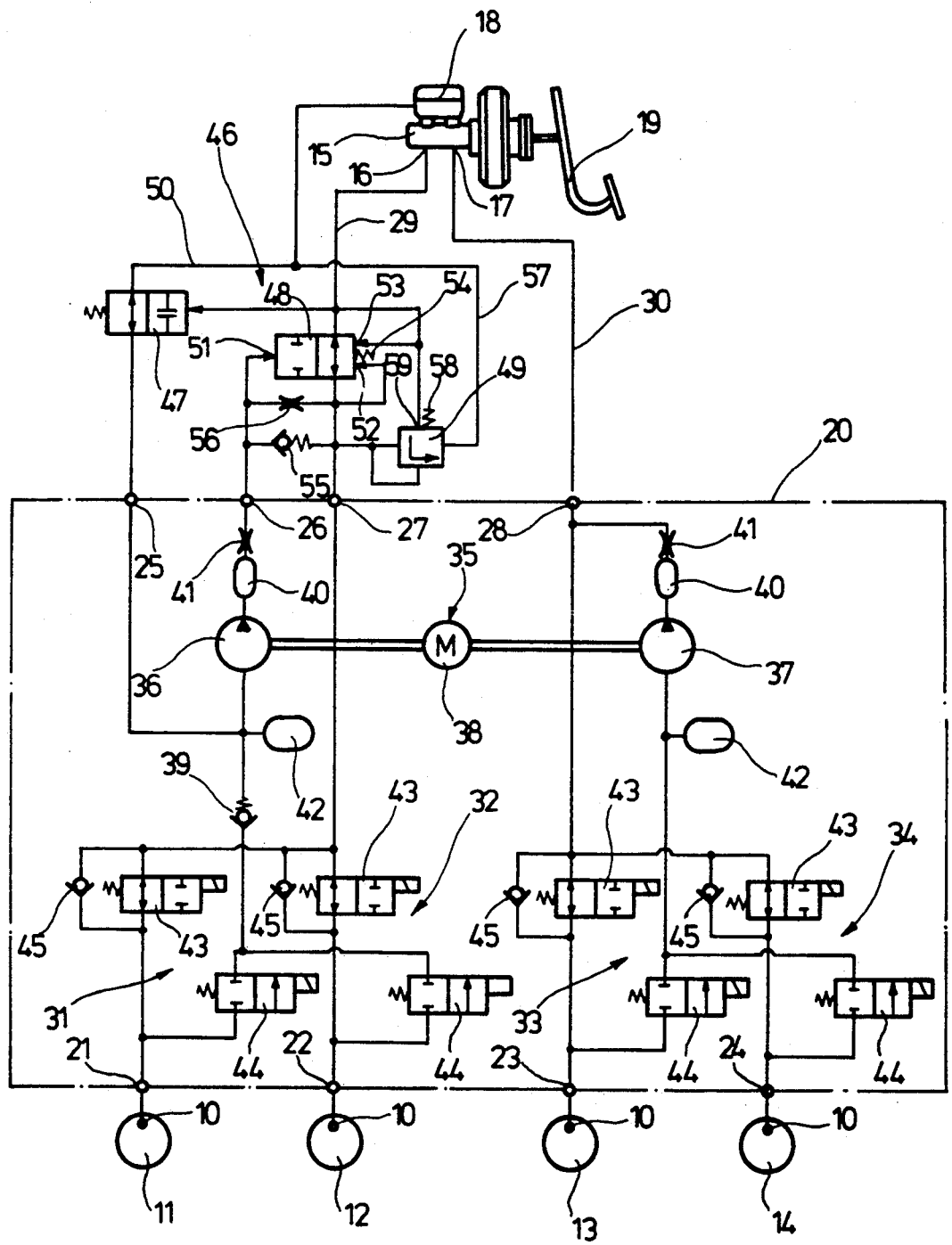
FIGS. 1 and 2 are each a block circuit diagram of a dual-circuit brake system with an anti-skid system and traction control for a passenger car, specifically with front/rear brake circuit distribution (FIG. 1) and diagonal brake circuit distribution (FIG. 2), respectively.

In the hydraulic dual-circuit brake system for a passenger car shown in a block circuit diagram in FIG. 1, which has front/rear or front/rear axle brake circuit distribution, an anti-skid system (ABS), and traction control (ASR), the wheel brake cylinders 10 of the driven wheels 11, 12 are disposed in one brake circuit, and the wheel brake cylinders 10 of the nondriven wheels 13, 14 are disposed in the other brake circuit.

Generally, the driven wheels 11, 12 are the rear wheels of the passenger car. In a manner known per se, the dual-circuit brake system includes a master brake cylinder 15, which has two separate brake circuit outlets 16, 17, each serving to connect one of the two brake circuits, and communicates with a brake fluid tank 18. Upon actuation of a brake pedal 19, a brake pressure of equal magnitude is controlled at the two brake circuit outlets 16, 17.

The dual-circuit brake system also includes a four-channel hydraulic unit 20, which has four outlet channels 21-24 and four inlet channels 25-28. The two inlet channels 27 and 28 communicate with a respective brake circuit outlet 16 and 17 via one connecting line each, 29 and 30. A wheel brake cylinder 10 of each of the wheels 11-14 is connected to each outlet channel 21-24. One control valve 31-34 is assigned to each outlet channel 21-24. The control valves 31-34 are controlled by an electronic control system, not shown here, and build up a wheel-slip-dependent brake pressure in the associated wheel brake cylinders 10. A return pump 35, which is a component of the four-channel hydraulic unit 20, has two pump elements 36, 37, which are driven jointly by an electric motor 38 and serve to return brake fluid when the pressure in the brakes is reduced. One pump element 36 or 37 each is operative in one brake circuit and communicates on the inlet side with the control valves 31, 32 and 33, 34, assigned to the respective brake circuit; one check valve 39, having a flow direction toward a pump element 36, is disposed in the connection between the operative pump element 36 in the brake circuit of the driven wheels 11, 12 and the control valves 31, 32 belonging to this brake circuit. The pump element 36, embodied as self-aspirating, is also connected on the inlet side to the inlet channel 25 of the four-channel hydraulic unit 20. On the outlet side, the pump element 36 communicates with the inlet channel 26, and the pump element 37 communicates with the inlet channel 28 of the four-channel hydraulic unit 20; one damper chamber 40 with a throttle restriction 41 on its outlet side is disposed in each connection. One low-pressure reservoir 42 is connected to the inlets of each of the two pump elements 36, 37 and serves to temporarily hold brake fluid flowing out of the wheel brake cylinders 10. Each pump element 36, 37 has a pump inlet valve and a pump outlet valve, not shown here for the sake of simplicity.

Each control valve 31-34 is embodied by a valve unit comprising one inlet valve 43 and one outlet valve 44. The inlet valve 43, in their basic position, enable unhindered passage from the inlet channels 27, 28 to the outlet channels 21-24 and to the wheel brake cylinders 10 of the wheels 11-14. In the working position brought about by magnet excitation, the inlet valves 43 block this passage. In their working position brought about by magnet excitation, the outlet valves 44 connect the outlet channels 21-24 and thus the wheel brake cylinders 10 to the inlet of the associated pump elements 36, 37, while in their unexcited basic position, they block this connection. The aforementioned check valve 39 is included in the connection between the outlet valves 44 and the control valves 31, 32 assigned to the driven wheels 11, 12. One check valve 45, having a flow direction toward the inlet channels 27, 28, is connected parallel to each of the inlet valves 43.

A valve assembly 46 serves to furnish a brake supply pressure during traction control (ASR mode). For this purpose, the valve assembly 46 has one charge valve 47 and one reversing valve 48, both embodied as hydraulically controlled 2/2-way valves, and one pressure limiting valve 49. The charge valve 47 is disposed in an intake line 50 that connects the inlet channel 25 of the four-channel hydraulic unit 20 to the brake fluid tank 18. The control inlet of the charge valve 47 acting counter to a restoring spring is connected to the connecting line 29 between the brake circuit outlet 16 of the master brake cylinder 15 and the inlet channel 27 of the four-channel hydraulic unit 20. In its uncontrolled basic position, the charge valve 47 keeps the intake line 50 open. Contrarily, the intake line 50 is blocked if a brake pressure is controlled at the brake circuit outlet 16 and thus in the connecting line 29 as a result of brake pedal actuation. The reversing valve 48 is disposed in the connecting line 29 between the brake circuit outlet 16 of the master brake cylinder 15 and the inlet channel 27 of the four-channel hydraulic unit 20. It has three hydraulic control inlets 51-53 and a restoring spring 54. The first control inlet is connected to the inlet channel 26, the second control inlet 52 is connected to the inlet channel 27 of the four-channel hydraulic unit 20, and the third control inlet 53 is connected to the brake circuit outlet 16 of the master brake cylinder 15. When the control inlets 51-53 are not under pressure, the restoring spring 54 keeps the reversing valve 48 in its basic position, in which the connecting line 29 is open. In the reversed position, the connecting line 29 is blocked. To generate suitable control pressures at the control inlets 51-53, a check valve 55 having a flow direction toward the second control inlet 52 is included between the first and second control inlet 51 and 52 or in other words between the inlet channels 26 and 27 of the four-channel hydraulic unit 20. A throttle 56 is connected parallel to the check valve 55. The pressure limiting valve 49 is connected on the inlet side to the inlet channel 27 and on the outlet side to a brake fluid return line 57 leading to the brake fluid tank 18. It has one additional control inlet 59, the control pressure of which acts with the force of a restoring spring 48, counter to the inlet pressure of the pressure limiting valve 49. This control inlet 59 is connected to the brake circuit outlet 16 of the master brake cylinder 15.

If drive slip occurs at at least one of the driven wheels 11, 12, the return pump 35 is switched on. The self-aspirating pump element 36 in the brake circuit of the driven wheels 11, 12 now aspirates brake fluid from the brake fluid tank 18, via the charge valve 47, and stores it under pressure in the wheel brake cylinders 10 of the driven wheels 11, 12, via the check valve 55 and the control valves 31, 32. Because of the pressure difference arising at the check valve 55 and thus at the two control inlets 51, 52 of the reversing valve 48, the reversing valve is switched over, and the master brake cylinder 15 is disconnected from the brake circuit of the driven wheels 11, 12. If only one driven wheel is slipping, for instance the driven wheel 11 then the inlet valve 43 of the control valve 32 assigned to the driven wheel 12 that is not slipping is reversed, so that the wheel brake cylinder 10 of the driven wheel 12 that is not slipping is blocked off from the brake supply pressure. Via the inlet valve 43 of the control valve 31, brake pressure is now built up solely in the wheel brake cylinder 10 of the spinning driven wheel 11, which is thus slowed down. The requisite brake pressure is established by pressure modulation, which is effected by switching the inlet and outlet valve 43, 44. Excess brake fluid is returned to the brake fluid tank 18 via the pressure limiting valve 49 and the return line 57. Toward the end of traction control, once no further drive slip is sensed, both the inlet valve 43 and the outlet valve 44 of the control valve 31 ar reversed. In this position of the control valve 31, brake fluid flows out of the wheel brake cylinder 10 of the driven wheel 11 into the low-pressure reservoir 42, via the check valve 39, and is pumped back from this reservoir into the brake fluid tank 18 by the pump element 36, via the pressure limiting valve 49 and the return line 57. The brake pressure is reduced again and the low-pressure reservoir 42 is pumped out until empty, so that if ABS operation ensues, the full capacity of the low-pressure reservoir 42 is available for brake pressure reduction. The return pump 35 is then switched off. Since there is no pressure at the control inlets 51-53, the restoring spring 54 returns the reversing valve 48 to its basic position, in which the communication between the four-channel hydraulic unit 20 and the master brake cylinder 15 is reestablished. If there is slip at both driven wheels, the inlet and outlet valves 43, 44 of both control valves 33, 32 are triggered in the manner described.

Upon brake pedal actuation, the brake pressure controlled at the brake circuit outlet 16 of the master brake cylinder 15 is present at both the control inlet 53 of the reversing valve 48 and the control inlet 59 of the pressure limiting valve 49. As a rule, this pressure is always greater than the pressure arising at the control inlet 51 in traction control, and so in every case the reversing valve 48 is returned to its basic position. At the same time, the pressure limiting valve 49 is blocked in its closing position via the control inlet 59, so that brake fluid cannot flow out of the connecting line 29 to the brake fluid tank 18 via the pressure limiting valve 49 and the return line 57. Thus it is possible at all times, including during ASR operation, to feed pressure into the brake circuit of the driven wheels 11, 12 upon brake pedal actuation.

Figure 4:
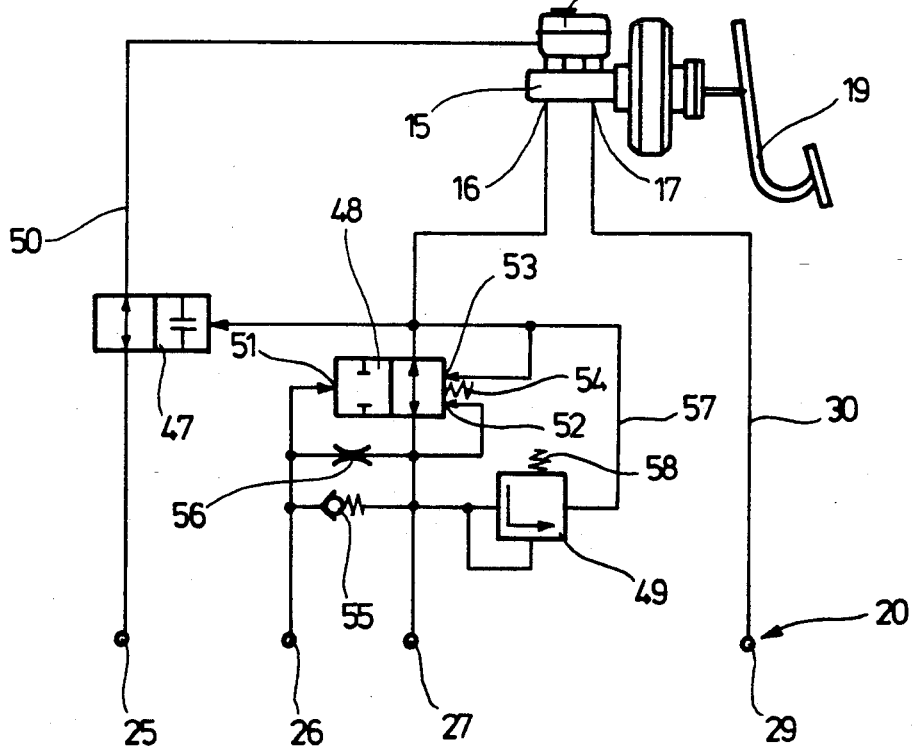
FIG. 4 is a detail of a block circuit diagram of a dual-circuit brake system with an anti-skid system and traction control and front/rear brake circuit distribution, in accordance with a further exemplary embodiment.

The dual-circuit brake system with front/rear brake circuit distribution, shown as a detail in the block circuit diagram of FIG. 4, has been modified compared with the dual-circuit brake system shown in FIG. 1 to the extent that the return line 57 connected to the outlet of the pressure limiting valve 49 communicates not with the brake fluid tank 18, but rather with the brake circuit outlet 16 of the master brake cylinder 15. Thus during traction control, the excess brake fluid is returned not to the brake fluid reservoir 18 but rather to the master brake cylinder 15. In this modification, the additional control inlet 59 at the pressure limiting valve 49 is omitted, since upon brake pedal actuation, a brake pressure of equal magnitude is present at both the inlet and the outlet of the pressure limiting valve 49. Otherwise, the dual-circuit brake system matches that of FIG. 1, and so identical components are identified by the same reference numerals.

Figure 2:
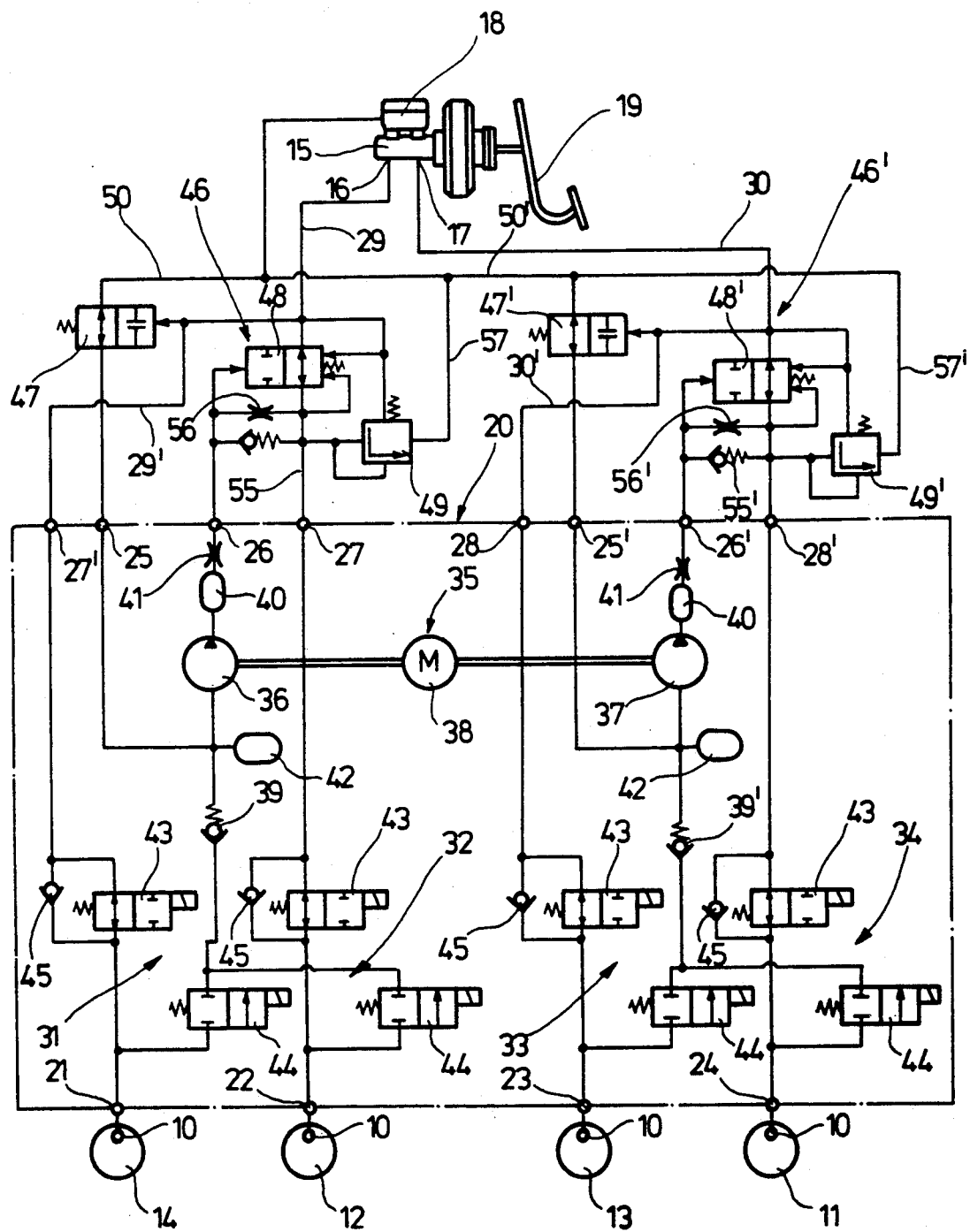

In the hydraulic dual-circuit brake system with diagonal brake circuit distribution shown in the form of a block circuit diagram in FIG. 2, the driven wheels 11, 12 belong to two different brake circuits. Generally, the driven wheels 11, 12 are the front wheels of the passenger car. To the extent that the dual-circuit brake systems match the dual-circuit brake system with front-/rear brake circuit distribution described for FIG. 1, identical elements are identified by the same reference numerals. In addition to the valve assembly 46, an identically embodied valve assembly 46' is present; one valve assembly 46, 46' is assigned to each brake circuit. The four-channel hydraulic unit 20 has an additional four inlet channels 25'-28'; all the inlet valves 43 of the control valves 31-34 are carried to a separate inlet channel 27', 27, 28', 28, which in turn communicate with the brake circuit outlet 16 of the master brake cylinder 15, via connecting lines 29', 29, or with the brake circuit outlet 17 of the master brake cylinder 15, via connecting lines 30', 30, respectively. The pump element 37, once again embodied as self-aspirating, communicates on the outlet side with the inlet channel 26' via the damper chamber 40, and a further check valve 39' with a flow direction toward the pump element 37 is included in the inlet-side connection of the pump element 37 with the outlet valve 44 of the control valve 33. The inlet of the pump element 37 communicates additionally with the inlet channel 25'. The wheel brake cylinder 10 of the non-driven wheel 13 is connected to the outlet channel 23, while the wheel brake cylinder 10 of the driven wheel 11 is connected to the outlet channel 24 of the four-channel hydraulic unit 20'.

The charge valve 47 and 47' of the identically embodied valve assemblies 46, 46' is disposed as described in the feed line 50 and 50', respectively, between the brake fluid tank 18 and the inlet channel 25 and 25', respectively. In turn, the reversing valve 48 and 48' is located in the respective connecting line 29 and 30 from the brake circuit outlet 16 and 17 to the inlet channel 27 and 28. The pressure limiting valve 49 and 49' is connected on the inlet side to the inlet channel 27 and 28 and on the outlet side to the return line 57 and 57' leading to the brake fluid tank 8. In the second valve assembly 46' as well, the parallel circuit of the check valve 55 and throttle 56 is connected between the inlet channel 26' and the inlet channel 28, so that this parallel circuit is operative between the first and second control input of the reversing valve 48'. The mode of operation of the dual circuit brake system with diagonal brake circuit distribution in traction control operation is the same as described for FIG. 1.

Figure 3:
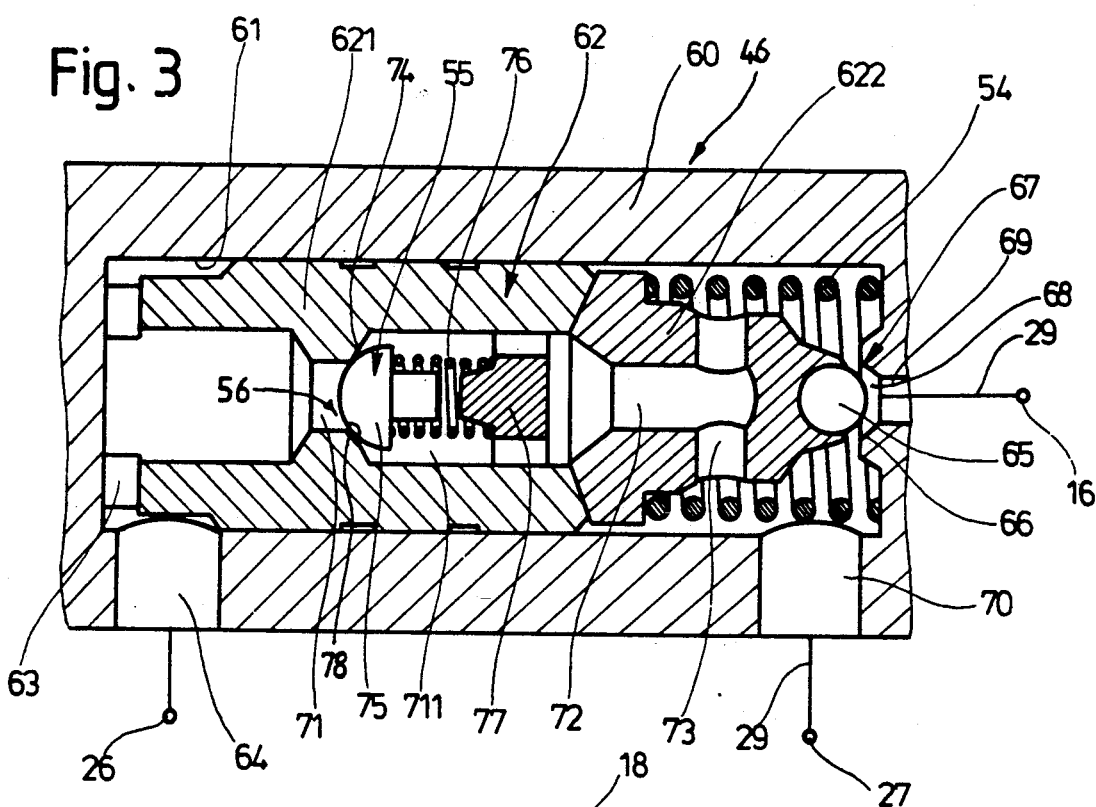
FIG. 3 is a longitudinal section through a structural unit comprising a hydraulic two-way valve and a check valve with a parallel throttle, in the dual-circuit brake system of FIG. 1 or 2.

In the valve assembly 46 of FIG. 1, as in the valve assembly 46' of FIG. 2, the reversing valve 48, check valve 55 and throttle 56 can be combined into a structural unit, as shown in FIG. 3. A piston 62 displaceable in a valve chamber 61 is disposed in a valve housing 60 and comprises two partial pistons 621 and 622. The partial piston 621 defines a control chamber 63 on the left in FIG. 3, which communicates with the inlet channel 26 of the four-channel hydraulic unit 20 via a connection 64. Under the influence of the restoring spring 54, the partial piston 622 presses against the partial piston 621, and on its face end remote from the partial piston 621 it has a spherical valve member 65 of a seat valve 67, which cooperates with a valve seat 66. The valve seat 66 surrounds a valve opening 68, which communicates with a connection 69 that communicates with the brake circuit outlet 16 of the master brake cylinder 15, via a portion of the connecting line 29. In the region of the partial piston 622, a third connection 70 discharges into the valve chamber 61, communicating with the inlet channel 27 of the four-channel hydraulic unit 20 via a portion of the connecting line 29.

When the control chamber 63 is without pressure, the valve member 65 lifts away from the valve seat 66, under the influence of the restoring spring 54, and the seat valve 67 is opened. The connecting line 29 is open, and the brake circuit outlet 16 of the master brake cylinder 15 communicates with the inlet channel 27 of the four-channel hydraulic unit 20. If a control pressure is fed into the control chamber 63 via the connection 64, the piston 62 is displaced to the right in FIG. 3, counter to the force of the restoring spring 54; the valve member 65 is seated on the valve seat 66, and the seat valve 67 is closed. The connecting line 29 is blocked. If a pressure is built up at the connection 69 when the seat valve 67 is closed, this pressure displaces the piston 62 to the left in FIG. 3, via the valve member 65, and the seat valve 67 opens. A pressure present at the connection 70 likewise acts in the opening direction upon the partial piston 622. The control inlets 51, 52 and 53, only schematically suggested in FIG. 1, of the reversing valve 48 are thus concretely realized.

The partial piston 62 is penetrated by a longitudinal bore 71, while the partial piston 622 has a blind bore 72, which is coaxial with the bore 71 and near its bottom is pierced by a transverse bore 73. The longitudinal bore 71 has one portion 711 of greater diameter, in which the check valve 55 with the parallel throttle 66 is disposed. At the transition between the longitudinal bore 71 and its portion 711, a valve seat 74 is formed, with which a valve member 75 cooperates that is supported on a stop 77, via a valve closing spring 76. The valve seat 74 and/or the valve member 75 is embodied such that when the valve member 75 is in contact with the valve seat 74, a throttle 56 is produced between them. As shown, the valve member 75 has an opening 78 for this purpose, for instance a defective point.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic brake system with an antiskid system (ABS) and traction control (ASR) system for a motor vehicle having driven and non-driven wheels and a brake cylinder for each of said driven and non-driven wheels, having a master brake cylinder with at least one brake circuit outlet (16), for controlling a brake pressure upon brake pedal actuation; a brake fluid tank (18) that communicates with the master brake cylinder; a hydraulic unit (20) that is connected to said at least one brake circuit outlet, said hydraulic unit has at least one outlet channel (21, 22) for connection of at least one wheel brake cylinder (11, 12) assigned to at least one driven wheel of the vehicle, at least one control valve (31, 32) connected to the at least one brake circuit outlet (16) via a first connecting line (29) and to the at least one outlet channel (21, 22), and a return pump (35) with at least one pump element (36, 37) embodied to be self-aspirating, said at least one pump element communicates on an inlet side with said at least one outlet channel via said at least one control valve and on an outlet side with the first connecting line (29) via a damper chamber (40);

a valve assembly (46) for furnishing a brake supply pressure in traction control, the valve assembly having a charge valve (47) with spring restoration that is connected to the at least one brake circuit outlet by a hydraulic control inlet via said first connecting line (29) and that at least in traction control, the inlet side of the at least one pump element (36, 37) is connected to the brake fluid tank via a first brake fluid return line (50) and said charge valve blocks, the connection to the first brake fluid return line (50), upon brake pedal actuation, a reversing valve (48, 48') is disposed in the first connecting line (29), a pressure limiting valve (49), said pressure limiting valve in traction control connects the outlet side of the at least one pump element with said first brake fluid return line via a second brake fluid return line (57), the reversing valve (48; 48') is embodied as a hydraulically controlled two-way valve with first, second and third hydraulic control inlets (51-53) and a restoring spring (54), of which pressure fluid via the first control inlet (51), acts counter to pressure fluid of said second and third control inlets (52, 53) and the restoring spring (54), said first control inlet (51) is connected to the outlet side of the damper chamber (40), the second control inlet (52) is connected to a portion of the first connecting line (29) located between the reversing valve (48) and the at least one control valve, and the third control inlet (53) is connected to the at least one brake circuit outlet (16) of the master brake cylinder (15); a first check valve (55) having a flow direction toward the second control inlet (52) and a throttle (56) parallel to said first check valve is connected between the first and second control inlets (51, 52); and that the pressure limiting valve (49) is connected on an inlet side thereof to a portion of the first connecting line (29) located between the reversing valve (48) and the at least one control valve and on an outlet side thereof to the second brake fluid return line (57).

2. A brake system as defined in claim 1, in which the second brake fluid return line (57) connected to said pressure limiting valve communicates with the brake fluid tank (18), and that the brake pressure controlled at the at least one brake circuit outlet (16) of the master brake cylinder (15) is applied to the pressure limiting valve (49), as a control pressure counteracting the inlet pressure of the pressure limiting valve (49).

3. A brake system as defined in claim 2, in which the pressure limiting valve (49) has a second control inlet (59) counteracting the control inlet communicating with the valve inlet, which second control inlet communicates with the at least one brake circuit outlet (16) of the master brake cylinder (15).

4. A brake system as defined in claim 1, in which said second brake fluid return line (57) communicates with the at least one brake circuit outlet (16) of the master brake cylinder (15) via said pressure limiting valve.

5. A brake system as defined in claim 1, in which the reversing valve (48), the first check valve (55) and the throttle (56) are combined into one structural unit.

6. A brake system as defined in claim 2, in which the reversing valve (48), the first check valve unit (55) and the throttle (56) are combined into one structural unit.

7. A brake system as defined in claim 3, in which the reversing valve (48), the first check valve unit (55) and the throttle (56) are combined into one structural unit.

8. A brake system as defined in claim 4, in which the reversing valve (48), the first check valve unit (55) and the throttle (56) are combined into one structural unit.

9. A brake system as defined in claim 1, in which a second check valve (39) having a flow direction toward the at least one pump element (36) is incorporated in a connection between the inlet of the at least one pump element (36) and the control valve (31).

10. A brake system as defined in claim 2, in which a second check valve (39) having a flow direction toward the at least one pump element (36) is incoporated in a connection between the inlet of the at least one pump element (36) and the control valve (31).

11. A brake system as defined in claim 3, in which a second check valve (39) having a flow direction toward the at least one pump element (36) is incoporated in a connection between the inlet of the at least one pump element (36) and the control valve (31).

12. A brake system as defined in claim 4, in which a second check valve (39) having a flow direction toward the at least one pump element (36) is incoporated in a connection between the inlet of the at least one pump element (36) and the control valve (31).

13. A brake system as defined in claim 5, in which a second check valve (39) having a flow direction toward the at least one pump element (36) is incoporated in a connection between the inlet of the at least one pump element (36) and the control valve (31).

14. A brake system as defined in claim 1, which includes a dual-circuit brake system having two brake circuits separate from one another and respectively connected to a first and a second brake circuit outlet (16, 17) of the master brake cylinder (15), in which the dual-circuit brake system includes two wheel brake cylinders (10) of the driven wheels (11, 12) disposed in said dual-circuit brake system.

15. A brake system as defined in claim 2, which includes a dual-circuit brake system having two brake circuits separate from one another and respectively connected to a first and a second brake circuit outlet (16, 17) of the master brake cylinder (15), in which the dual-circuit brake system includes two wheel brake cylinders (10) of the driven wheels (11, 12) disposed in said dual-circuit brake system.

16. A brake system as defined in claim 3, which includes a dual-circuit brake system having two brake circuits separate from one another and respectively connected to a first and a second brake circuit outlet (16, 17) of the master brake cylinder (15), in which the dual-circuit brake system includes two wheel brake cylinders (10) of the driven wheels (11, 12) disposed in said dual-circuit brake system.

17. A brake system as defined in claim 4, which includes a dual-circuit brake system having two brake circuits separate from one another and respectively connected to a first and a second brake circuit outlet (16, 17) of the master brake cylinder (15), in which the dual-circuit brake system includes two wheel brake cylinders (10) of the driven wheels (11, 12) disposed in said dual-circuit brake system.

18. A brake system as defined in claim 5, which includes a dual-circuit brake system having two brake circuits separate from one another and respectively connected to a first and a second brake circuit outlet (16, 17) of the master brake cylinder (15), in which the dual-circuit brake system includes two wheel brake cylinders (10) of the driven wheels (11, 12) disposed in said dual-circuit brake system.

19. A brake system as defined in claim 9, which includes a dual-circuit brake system having two brake circuits separate from one another and respectively connected to a first and a second brake circuit outlet (16, 17) of the master brake cylinder (15), in which the dual-circuit brake system includes two wheel brake cylinders (10) of the driven wheels (11, 12) disposed in said dual-circuit brake system.

20. A brake system as defined by claim 1, in which the throttle (56) of the first check valve (55) is embodied by a provision that a valve member (75) including an associated valve seat (74) has an opening (78) by means of which a throttling action is generated upon contact of said valve member with the valve seat (74).

21. A brake system as defined by claim 2, in which the throttle (56) of the first check valve (55) is embodied by a provision that a valve member (75) including an associated valve seat (74) has an opening (78) by means of which a throttling action is generated upon contact of said valve member with the valve seat (74).

22. A brake system as defined by claim 3, in which the throttle (56) of the first check valve (55) is embodied by a provision that a valve member (75) including an associated valve seat (74) has an opening (78) by means of which a throttling action is generated upon contact of said valve member with the valve seat (74).

23. A brake system as defined by claim 4, in which the throttle (56) of the first check valve (55) is embodied by a provision that a valve member (75) including an associated valve seat (74) has an opening (78) by means of which a throttling action is generated upon contact of said valve member with the valve seat (74).

24. A brake system as defined by claim 5, in which the throttle (56) of the first check valve (55) is embodied by a provision that a valve member (75) including an associated valve seat (74) has an opening (78) by means of which a throttling action is generated upon contact of said valve member with the valve seat (74).

25. A brake system as defined by claim 9, in which the throttle (56) of the first check valve (55) is embodied by a provision that a valve member (75) including an associated valve seat (74) has an opening (78) by means of which a throttling action is generated upon contact of said valve member with the valve seat (74).

26. A brake system as defined by claim 14, in which the throttle (56) of the first check valve (55) is embodied by a provision that a valve member (75) including an associated valve seat (74) has an opening (78) by means of which a throttling action is generated upon contact of said valve member with the valve seat (74).

* * * * *